A. B. COWLES.
PLANT PROTECTOR.
APPLICATION FILED APR. 17, 1912.
1,110,377. Patented Sept. 15, 1914.
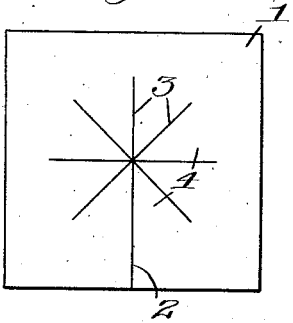
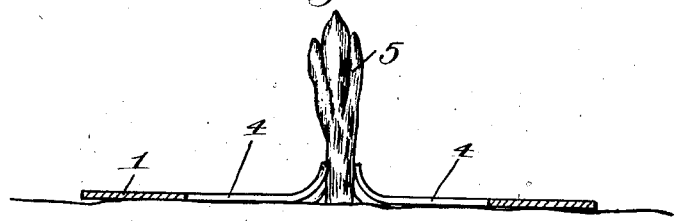
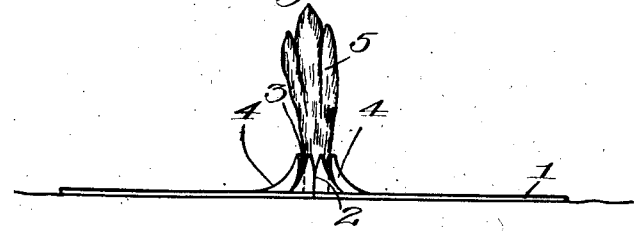

UNITED STATES PATENT OFFICE.

ARTHUR B. COWLES, OF ROCHESTER, NEW YORK.

PLANT-PROTECTOR.

1,110,377.  Specification of Letters Patent.  Patented Sept. 15, 1914.

Application filed April 17, 1912. Serial No. 691,265.

*To all whom it may concern:*

Be it known that I, ARTHUR B. COWLES, of Rochester, in the county of Monroe and State of New York, have invented a new and useful improvement in Plant-Protectors, which improvement is fully set forth in the following specification and shown in the accompanying drawings.

The present invention relates to plant protectors and more particularly to the type employed for protecting young plants against insects, and an object of the invention is to provide an insect-destroying device adapted to surround young plants, while, at the same time, permitting moisture or water to pass to the roots of such plant.

Another object of the invention is to provide a construction which will permit the plants to grow without injury to such plants.

To these and other ends the invention consists in certain parts and combination of parts, all of which will be hereinafter described and more particularly pointed out in the appended claims.

In the drawings: Figure 1 is a plan view of a device constructed in accordance with this invention; Fig. 2 shows the device in section applied to a small plant; and Fig. 3 shows the device in elevation applied to a small plant.

In the illustrated embodiment of the invention there is employed a sheet of material which is either coated, saturated or otherwise provided with an insecticide. In the present instance, tar paper is employed. This paper is preferably cut into small blocks 1 of rectangular or other form and is provided with a cut or slit 2 extending from one edge thereof toward the center. At the inner end of the slit 2, branch slits or cuts 3 are provided which preferably are radially arranged in order to provide flexible tongues 4 of V or wedge-shaped construction leading to a common point.

In the use of the device, it is passed about a plant 5 by spreading the cut 2 and causing the tongues to coöperate with the plant on an inclination, as shown in Figs. 2 and 3. When in this position the tongues separate and provide slots or openings through which moisture may pass to the roots of the plant, as it will be apparent that the tar paper is water-proof and will otherwise prevent water reaching the plant roots. The tongues being flexible will expand with the growth of the plant, and in this way will not act to choke it during its growth. It is customary for certain insects to deposit their eggs about the roots of such plants as cabbage and cauliflower, so that the young may afterward feed upon the plant. With this arrangement, the eggs are destroyed by the tar paper before they hatch, and in this manner the plant is protected.

What I claim as my invention and desire to secure by Letters Patent is:

1. As an article of manufacture, a plant protector comprising a sheet of material which contains an insecticide and which is provided with a plurality of slits, one of said slits extending outwardly through the edge of the sheet and all of said slits meeting at a common point and providing flexible tongues which lie closely together so as to prevent the passage of insects through the sheet between the tongues and whereby the eggs of the insects are deposited upon and retained on the flat sheet of material.

2. A plant protector composed of a flat sheet of material containing an insecticide and whose body portion is adapted to lie flat upon the ground and which is provided with a plurality of slits providing a plurality of tongues whose outer ends are adapted to lie flat on the ground and whose inner ends are adapted to be bent out of the plane of the body to singly embrace plants of various sizes, said slits lying so closely together as to prevent passage of insects through the sheets between the tongues whereby the insect eggs are caused to remain on the body of the flat sheet of material including the outer ends of said tongues rather than on the ground adjacent the root of the plant.

ARTHUR B. COWLES.

Witnesses:
HAROLD H. SIMMS,
ADA M. WHITMORE.